United States Patent
Paternoster

(10) Patent No.: US 8,877,874 B2
(45) Date of Patent: Nov. 4, 2014

(54) PA 12 POWDER FOR USE IN A GENERATIVE LAYER-WISE MANUFACTURING METHOD

(75) Inventor: Stefan Paternoster, Andechs (DE)

(73) Assignee: EOS GmbH Electro Optical Systems, Krailling (DE)

(*) Notice: Subject to any disclaimer, the term of this patent is extended or adjusted under 35 U.S.C. 154(b) by 8 days.

(21) Appl. No.: 13/049,995

(22) Filed: Mar. 17, 2011

(65) Prior Publication Data

US 2011/0237731 A1  Sep. 29, 2011

(30) Foreign Application Priority Data

Mar. 25, 2010  (EP) ..................................... 10157842

(51) Int. Cl.
| | | |
|---|---|---|
| C08L 77/02 | (2006.01) | |
| B29K 277/00 | (2006.01) | |
| B29C 67/04 | (2006.01) | |
| B29C 67/00 | (2006.01) | |
| B29K 77/00 | (2006.01) | |

(52) U.S. Cl.
CPC ............ *B29C 67/0077* (2013.01); *C08L 77/02* (2013.01); *C08L 2205/02* (2013.01); *B29K 2077/00* (2013.01)
USPC ........... 525/432; 264/125; 264/126; 264/308; 264/401

(58) Field of Classification Search
USPC .................. 264/125–126, 308, 401; 525/432
See application file for complete search history.

(56) References Cited

U.S. PATENT DOCUMENTS

| | | |
|---|---|---|
| 4,334,056 A | 6/1982 | Meyer et al. |
| 5,932,687 A | 8/1999 | Baumann et al. |
| 6,022,613 A * | 2/2000 | Ren ................................ 428/220 |
| 6,245,281 B1 | 6/2001 | Scholten et al. |
| 2004/0102539 A1 | 5/2004 | Monsheimer et al. |
| 2006/0071359 A1 | 4/2006 | Monsheimer et al. |
| 2006/0246287 A1 | 11/2006 | Gersch et al. |
| 2008/0249237 A1 * | 10/2008 | Hager et al. .................. 524/606 |
| 2009/0206522 A1 | 8/2009 | Hein et al. |
| 2009/0236775 A1 | 9/2009 | Monsheimer et al. |

FOREIGN PATENT DOCUMENTS

| | | |
|---|---|---|
| DE | 29 06 647 | 4/1980 |
| DE | 197 08 946 | 9/1998 |
| DE | 197 47 309 | 4/1999 |

(Continued)

OTHER PUBLICATIONS

DIN EN ISO 307:2003-12, 22 pages (German translation).
"Plastics—Pollyamides—Determination of viscosity number (ISO 307:2007)", prepared by Technical Committee CEN/TC 249 "Plastics" (Secretariat: IBN, Belgium), DIN EN ISO 307:2007-08, 39 pages (English translation).

*Primary Examiner* — Brieann R Fink
(74) *Attorney, Agent, or Firm* — Seyfarth Shaw LLP

(57) ABSTRACT

A powder mixture is described, which is suitable for a layer-wise manufacturing of a three-dimensional object by solidifying a building material in powder form. The powder mixture consists of a mixture of a first polyamide 12 powder and a second polyamide 12 powder, wherein the first polyamide 12 powder is characterized by an increase of its viscosity number determined in accordance with ISO 307 that is less than 10%, when the powder is exposed for 20 hours to a temperature that lies 10° C. below its melting temperature under nitrogen atmosphere, and the second polyamide 12 powder is characterized by an increase of its viscosity number, determined in accordance with ISO 307, by 15% or more, when the powder is exposed for 20 hours to a temperature that lies 10° C. below its melting temperature under nitrogen atmosphere.

15 Claims, 4 Drawing Sheets

(56) References Cited

FOREIGN PATENT DOCUMENTS

| | | |
|---|---|---|
| DE | 103 30 590 | 4/2004 |
| DE | 10 2004 047 876 | 4/2006 |
| DE | 10 2006 053 121 | 12/2007 |
| EP | 1 642 923 | 4/2006 |
| JP | 11-216779 | 8/1999 |
| JP | 2004-137465 | 5/2004 |
| JP | 2006-508217 | 3/2006 |
| JP | 2009-226952 | 10/2009 |

* cited by examiner

PA 12 POWDER FOR USE IN A GENERATIVE LAYER-WISE MANUFACTURING METHOD

CROSS-REFERENCE TO RELATED APPLICATIONS

This application claims priority to and wholly incorporates by reference European Patent Application No. 10 157 842.5, having a filing date of Mar. 25, 2010.

FIELD OF THE INVENTION

The invention refers to a method for a layer-wise manufacturing of a three-dimensional object by means of the action of electro-magnetic radiation or particle-radiation on a building material in powder form, wherein a polyamide 12 powder is used as building material. Further, the invention refers to a PA 12 powder to be used in such a method as well as to a three-dimensional object that has been manufactured by such a method.

BACKGROUND

In generative manufacturing methods, in which a three-dimensional object is manufactured layer-wise by sintering or melting a building material in powder form, plastic powders play an important role as starting materials as such materials are advantageous for the process due to their low melting points and small heat conductivities. Usually, the energy that is necessary for the sintering or melting process is introduced by means of a laser. However, to some extent also electron beams or infrared beams are used for the same purpose.

DE 197 47 309 A1 describes a polyamide 12 powder of the prior art, which powder is particularly useful for selective laser sintering.

DE 10 2006 053 121 B3 describes a laser sintering device as device for manufacturing a three-dimensional object, which is shown in FIG. 4. The build-up process takes place in a container 1, which is open to the top. A support 2 for supporting the three-dimensional object 3 to be built is provided in the container. By a drive 4 the support 2 can be moved up and down in a vertical direction A in the container 1. The upper edge of the container 1 defines a build-up zone 5. An irradiation device 6 in the form of a laser is arranged above the build-up zone 5, which irradiation device emits a directed laser beam 18, that is directed at the build-up zone 5 by means of a deflection device 7. Further, an application device 40 (sometimes also named "re-coater") is provided for applying a layer of a material in powder form, which material is to be solidified, onto the surface of the support 2 or onto the most recently solidified layer. The application device 40 can be moved bidirectionally across the build-up zone 5 by means of a drive, which is schematically indicated by the arrows B. The application device is fed from two powder reservoirs 10 by means of two dosage devices 9 at the left and at the right of the build-up zone. Furthermore, two overflow containers 11 are provided at the left and at the right of the build-up zone, which overflow containers are able to accommodate the surplus powder that accumulates during the application of powder.

A heating device 12 for heating the powder bed 19 and in particular for pre-heating an applied powder layer that has not yet been sintered (solidified) to a suitable build temperature, is arranged above the build-up zone 5. For example, the heating device 12 is constructed in the form of one or more radiant heaters such as infrared heaters. The heating device is arranged above the build-up zone 5 such that an applied powder layer can be uniformly heated.

A temperature measuring device 13 such as a pyrometer or an IR camera is provided above the build-up zone 5 at a distance to it. By the temperature measuring device the temperature of the most recently applied powder layer can be measured.

A process chamber 16 secludes the build-up zone from the surrounding. Thus, it is possible to carry out a build process in the absence of air and to prevent an oxidation of the powder.

An open-loop control and/or a closed-loop control 17 serves for an open-loop control and/or a closed-loop control of the movement B of the application device 40. This open-loop control device and/or closed-loop control device also makes an open-loop control/closed-loop control of the movement A of the support 2, of the power of the heating device 12, of the power of the irradiation device 6 and of the deflection by the deflection device 7. To this effect the open-loop control device/closed-loop control device 17 is connected to the drive of the application device 40, the drive 4, the heating device 12, the temperature measuring device 13, the deflection device 7 as well as to the irradiation device 6.

In the following the operation of such a laser sintering device will be described:

At first, the application device 40 is positioned below the dosage device 9 and is filled with an amount of material in powder form for one layer from the reservoir 10.

Afterwards a powder layer is applied onto the support 2 or a most recently solidified layer by moving the application device 40 parallel with the surface of the build-up zone 5. In the process, material in powder form is replenished from the application device. After the application of a layer of the material in powder form, a solidification is carried out at those positions of the layer that correspond to a cross-section of the object, wherein the layer is exposed to the light of the laser beam 18. After the solidification of one layer, the support 2 is lowered by a distance that corresponds to the thickness of one layer and the above-described steps are repeated until the manufacturing of the three-dimensional object 3 is completed.

During the build process the object to be generated rests inside of the powder bed of unsolidified powder that is surrounding it, whereby the object is supported by such powder. As a result, at the completion of a build process usually there are substantial amounts of unsolidified powder. Therefore, it is desirable to re-use as much as possible of such so-called "old powder" for a further build process. However, as the unused powder was exposed to high temperatures immediately below its melting point for long periods of time during a build process, there is the problem that due to these environmental conditions the powder may have been subject to an aging process, in which aging process it could be damaged thermally and/or thermooxidatively. This leads to the situation that for further build processes the old powder has to be mixed with fresh powder, wherein the proportion of fresh powder usually has to be at least 50%. The percentage of fresh powder often is also designated as "reconditioning rate", "renewal rate" or "refresh rate".

DE 103 30 590 A1 concludes that this aging process may be explained by a post-condensation:

Under the environmental conditions during a build process, the free carboxy and amino end groups in polyamide 12 react with each other under dehydration (the actual post-condensation) also in the unused powder. Furthermore, in DE 103 30 590 A1 it was observed that the loss of amino groups is more than stoichiometric in relation to carboxy groups. It was assumed that a cause for this would be a thermooxidative elimination of the amino groups with subsequent cross-linking. In each case the aged powders showed a remarkable increase of the solution viscosity.

In order to increase the re-usable portion of old powder, DE 103 30 590 A1 suggests to use for the build process always a polyamide, in which there is a ratio of carboxy end groups to amino end groups of at least 2:1 and in which the content of amino end groups is below 40 mmol/kg (regulated polyamide), in contrast to a so-called unregulated polyamide as it is for example described in DE 197 08 946. The desired end group ratio here is obtained by a carboxylic acid as regulator. Here, in DE 103 30 590 A1 only a small increase of the solution viscosity after an aging of the powder was also observed for powder mixtures of regulated and unregulated PA 12. Without giving any further reasons, a preferable range from 10-90% and an especially preferable range from 25-75% were cited for the proportion of a regulated polyamide.

It is important that the objects to be manufactured have advantageous mechanical properties, in particular a high elongation at break. In this regard, DE 103 30 590 A1 refers to an improvement of the mechanical properties of the manufactured part due to the use of regulated polyamide 12. However, irrespective of such fact, when carrying out a laser sintering of plastic powders, further boundary conditions have to be taken into consideration besides the mechanical properties of the object to be manufactured: On the one hand, attention has to be paid to a part warping that is as small as possible. On the other hand attention has to be paid to a quality of the outer surfaces of the object that is as high as possible.

Part warpage is a known problem. It is caused by a shrinking of semi-crystalline plastic materials during cooling down. A large change of volume during the solidification leads to an upward bending of the ends of the object. A non-satisfying surface quality of the outside part walls manifests itself in so-called depressions (sometimes also called dips), which are referred to as "sink marks" or "orange peel" and which can be particularly observed when old powder has been re-used.

SUMMARY

Therefore, it is an object of the present invention to provide a method for a layer-wise manufacturing of three-dimensional objects from a build material in powder form, to provide such a build material and to provide objects that have been manufactured by such a method, wherein the completed objects do not only have good mechanical properties, but also have a small warpage and a high surface quality.

The object is achieved by a powder mixture according to claim 1, a method for manufacturing a three-dimensional object according to claim 12, the use of a powder mixture according to claim 14 and a three-dimensional object according to claim 15.

Further developments according to the invention are described in the dependent claims.

As was already mentioned in the beginning, DE 103 30 590 A1 suggests using a regulated PA 12 powder as building material in a laser sintering process. For regulated polyamide 12 a thermal stress during the build process does not lead to a noticeable increase of the solution viscosity, which is accompanied by the growth of molecular weight. Accordingly, one should think that in order to obtain a powder that can be re-used as often as possible, it is most advantageous to use a powder mixture having a proportion of regulated polyamide 12 as high as possible in the mixture.

However, surprisingly it was found in the present invention that a high percentage of regulated polyamide 12 powder does not necessarily lend itself for the manufacturing of low-warpage objects having satisfying mechanical properties. Rather, there is a fairly precisely defined range, within which the proportion of regulated polyamide 12 powder must lie. After having carried out extensive tests, it was found that low-warpage objects having a large elongation at break and good surfaces can be manufactured only if the proportion of regulated polyamide 12 in a mixture of regulated polyamide 12 and unregulated polyamide 12 lies between 10 and 30 weight-percent, preferably between 10 and 23 weight-percent. Here, the way, in which a regulation is obtained in the regulated polyamide 12 does not play any role. It was found that the only thing that matters is that the proportion of that polyamide, which has no growth in molar mass, has to lie between 10 percent by weight and 30 percent by weight.

In particular, when the powder according to the invention is re-used in a building process as old powder, the advantage of the use of such a powder mixture can be seen. With the powder according to the invention it is in particular possible to manage with a proportion of new powder (=refresh rate) that lies only between 0.1 percent by weight and 40 percent by weight, preferably 30 percent by weight, though parts that are produced have satisfying mechanical properties and to the same extent do have a satisfying warpage and a satisfying surface quality.

Further features and advantages of the invention can be derived from the description of embodiments.

DETAILED DESCRIPTION

By means of a laser sintering method carried out on an EOSINT P380 system of the applicant different test structures were built. By means of the test structures
the elongation at break as most important mechanical property,
the warpage behavior and
the surface condition
were determined in order to show the advantage of the powder mixture according to the invention.

Figure 1:
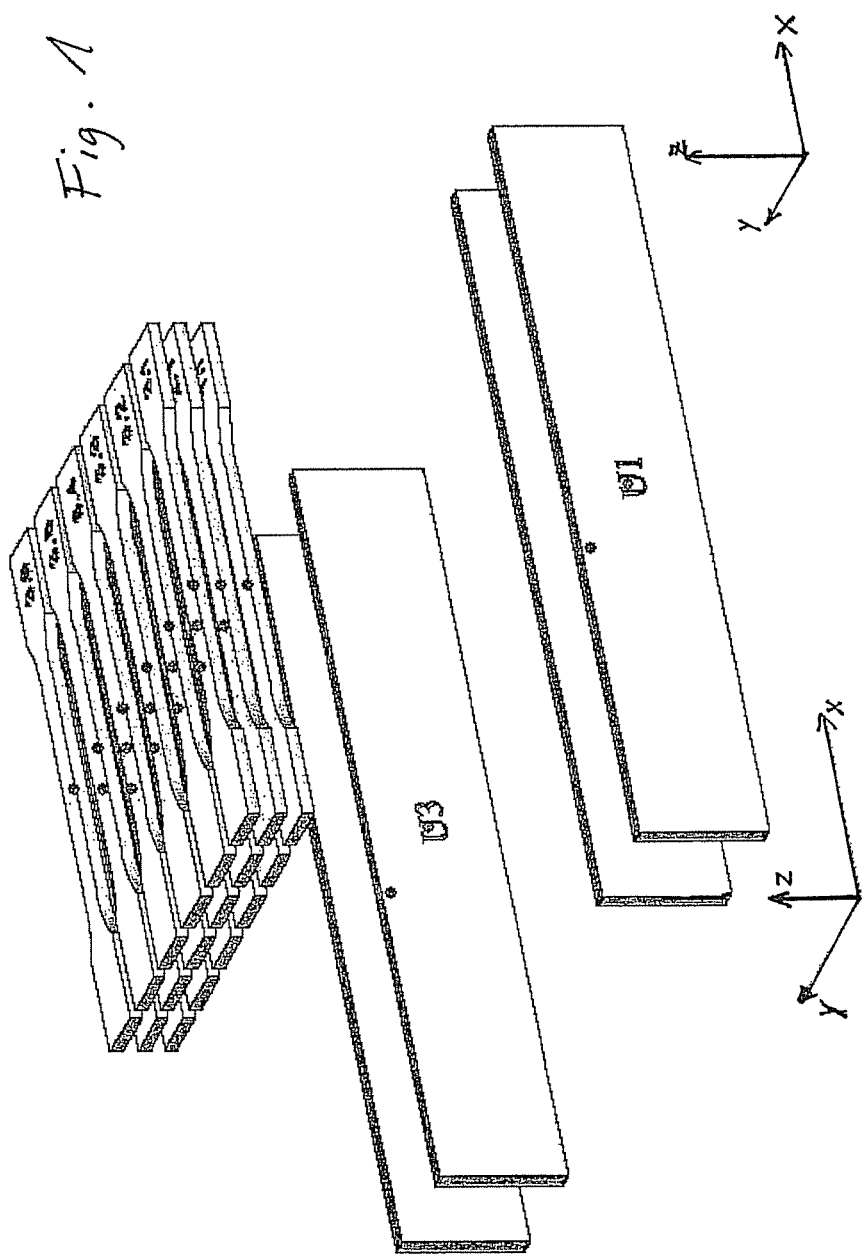
FIG. 1 shows the locations of manufactured test structures in the building space of an EOSINT P380 system that was used.

FIG. 1 shows the manufactured test structures after the completion of the building process, wherein the powder that has not been solidified is not shown. Thus, the drawing shows the locations of the objects in the building space. Four warp rods 1 having the dimensions 250 mm×42 mm×6 mm and 18 xy tensile bars 3 in accordance with ISO 527-2 can be identified. The elongation at break in x and y directions was determined by means of the xy tensile bars 3. The warpage behavior and the quality of the surface were determined by means of the warp rods 1.

The powder PA 2200, which is commercially distributed by the applicant, the powder Vestosint 2157, which is commercially distributed by the company Evonik, as well as mixtures of both powders were used as building material. The powder mixtures were obtained by a dry mixing of the starting powders using a concrete mixer (dry blend). However, it would also be possible to produce a mixture by crystallizing the starting materials in ethanol in accordance with the method described in DE 290 66 47 B1.

PA 2200 powder is a polyamide 12 powder, in which no particular provisions were made to positively affect the aging process during a building process. This leads to the fact that for this powder an increase of the molar mass can be found after the powder has been used in a laser sintering process.

Vestosint 2157 powder is also a polyamide 12 powder. However, for this powder no appreciable increase of the molar mass can be found after the powder has been used in a building process in a laser sintering device.

In order to obtain objective conclusions on the aging behavior of the powders that were used, both starting powders in a pure form were exposed for 20 hours to a temperature that lay 10° C. below their respective melting temperature, which melting temperature was determined in accordance with the standard ISO 11357. Here, the powders were exposed to the temperature in an oven under a nitrogen atmosphere. The respective DSC measurements for determining the melting temperature were carried out using a Mettler Toledo DSC 823. Here, differing from the standard, a temperature ramp of 0° C.-250° C.-0° C. was used, wherein the starting temperature and the end temperature (in each case 0° C.) were held for three minutes and also the length of stay at the maximum value of 250° C. was three minutes. Furthermore, in the measurements the heating rate and the cooling rate, respectively, was 20 K/min and the weighted sample was 5 mg to 5.5 mg.

After the oven treatment for both powders the viscosity number in accordance with ISO 307 was determined and compared to the respective viscosity number before the oven treatment. It appeared that for the PA 2200 powder the viscosity number in accordance with ISO 307 rose from 120 ml/g to 283 ml/g, thus by 135.8%. On the other hand, for the Vestosint 2157 powder, the viscosity number in accordance with ISO 307 rose from 109 ml/g to 114 ml/g, thus only by 4.6%.

The test objects were built by using different powder mixtures, in which the respective proportion of Vestosint 2157 powder in the mixture with PA 2200 powder was 0%, 10%, 15%, 23%, 30% and 100%. Here, strictly speaking, one cannot refer to a mixture with regard to the percentage values of 0% and 100%. Also for the above powder mixtures the rise of the viscosity number was determined after an oven treatment for 20 hours as described above. The viscosity number after an oven treatment was between 235 and 270 ml/g for the mixtures. In particular, a rise from 119 ml/g to 270 ml/g was observed for a 10% proportion of Vestosint and a rise from 117 ml/g to 246 ml/g was observed for a 30% proportion of Vestosint.

In order to make the results comparable to one another, all building processes were carried out using exactly the same conditions. The building temperature, namely the temperature of the powder immediately before it is struck by the laser radiation, was 179° C. Before the start of a building process, the powder was pre-heated in the building chamber for two hours using the setting "automatic heating-up" of the EOSINT P380 system (software version PSW 3.2). During the solidification of the powder, the exposure parameter "mechanic" was set in the EOSINT P380 system (software version PSW 3.2).

As can be clearly seen in FIG. 1, the material was solidified only in a height exceeding a certain height above the building platform. In particular, the height of the layer stack of unsolidified powder layers, which were located immediately on the building platform, was 6 mm. After the building process was completed, the distance of the uppermost powder layer from the building platform was approximately 155 mm.

For each powder mixture one building process was carried out, in which powder material was used that never before had been used in such a manufacturing process and thus had not yet been subjected to a temperature stress. The xy tensile bars 3 obtained in that building process were used for determining the elongation at break in accordance with ISO 527-2.

For each powder mixture, in a further building process, powder was used that consisted of 70% old powder and 30% fresh powder, wherein material from a previously carried out building process, which material had not been used up in that process, was used as old powder. By means of the warp rods 1 that were obtained by this second building process, the surface quality and the warpage behavior were measured. The reason is that both properties have inferior values in particular in a case in which reconditioned or refreshed powder (meaning building material with a fraction of old powder) is used.

In Table 1, the measurement values for the elongation at break, for the warpage and for the depressions (dips) are listed.

TABLE 1

| | Proportion of Vestosint 2157 [%] | | | | | |
|---|---|---|---|---|---|---|
| | 100 | 30 | 23 | 15 | 10 | 0 |
| Elongation at break in xy direction [%] | 4.36 | 14.74 | 18.38 | 18.89 | 20.31 | 19.82 |
| Warpage [mm$^{-1}$] | −0.0263 | −0.0394 | −0.0243 | −0.0952 | −0.0991 | −0.1451 |
| Dips for a refresh rate of 30% | no | no | no | no | slight | considerable |

The elongation at break was determined in accordance with ISO 527-2, wherein the stated percentage is the percentage elongation of a tensile bar after break. The uncertainty was below 5%.

Figure 3:
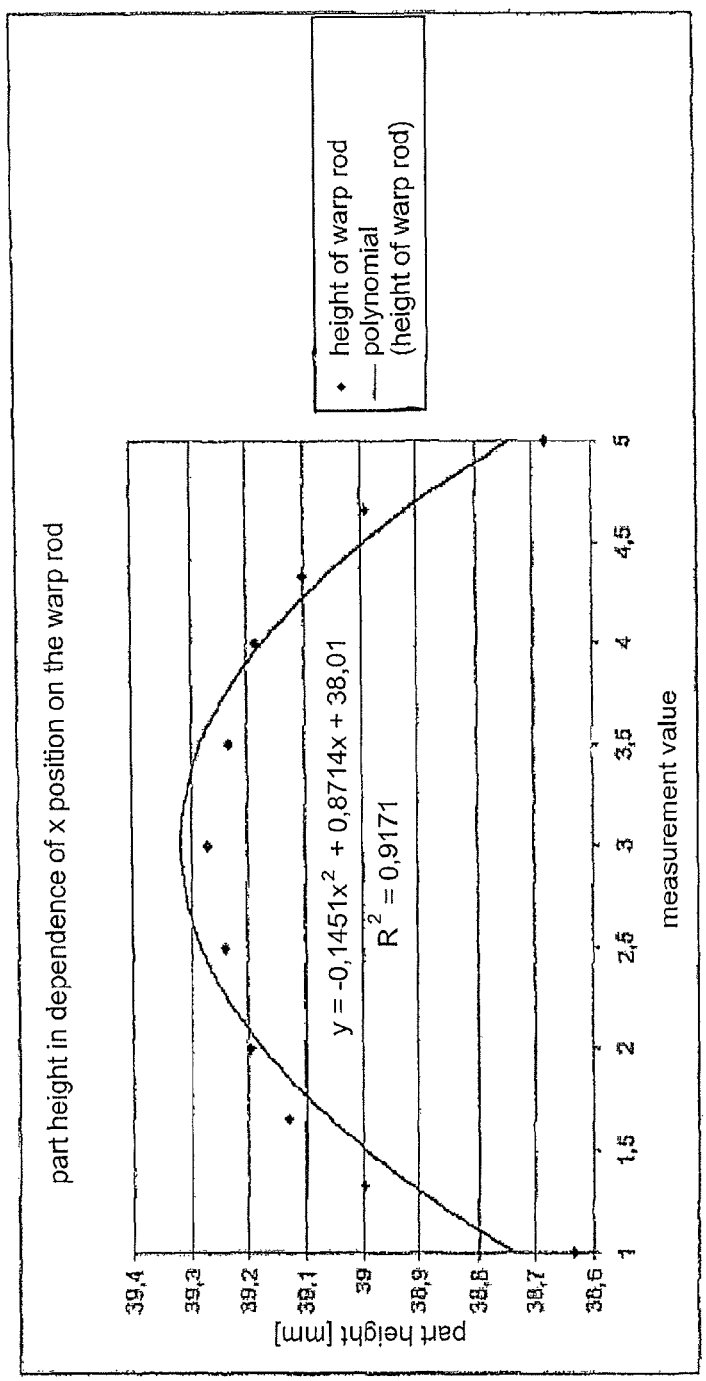
FIG. 3 is a diagram that illustrates how the values for the warpage are determined.
Figure 4:
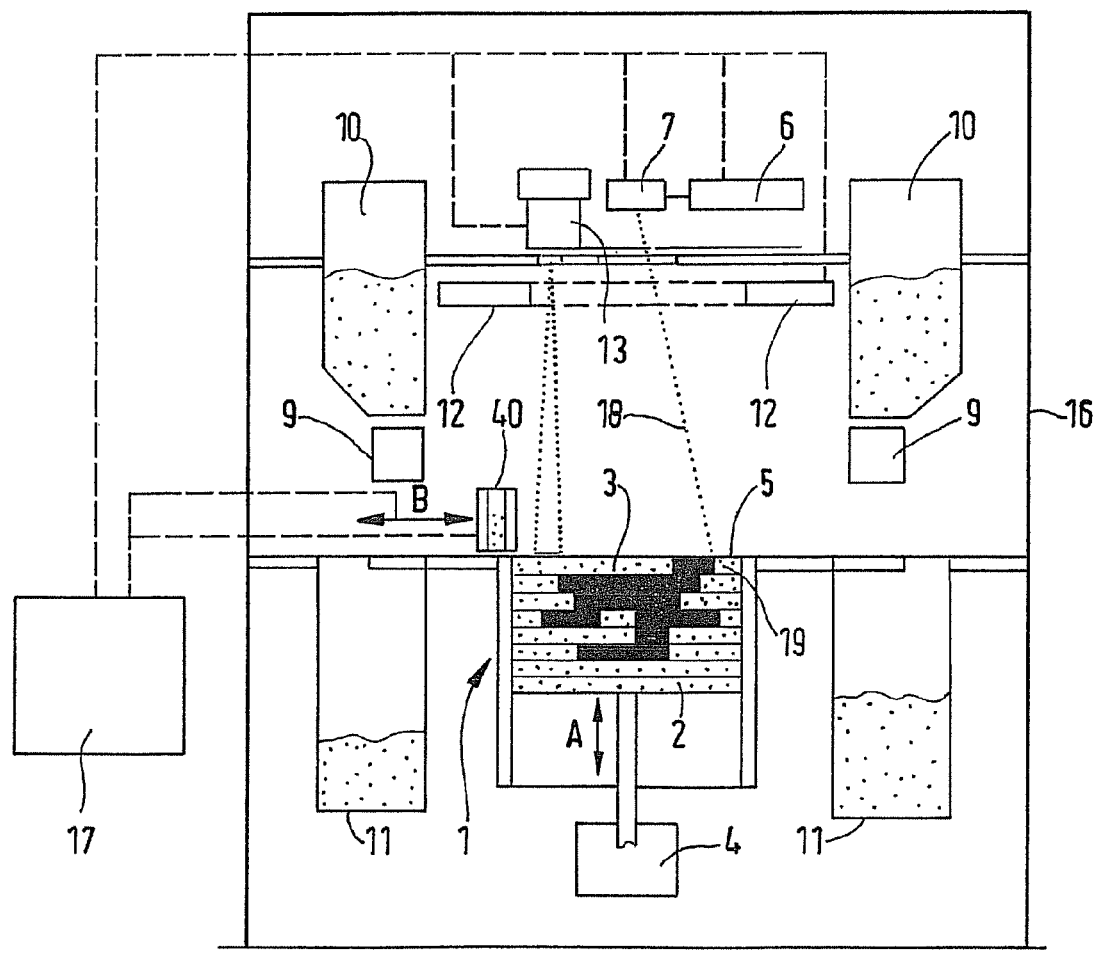
FIG. 4 shows a laser sintering device according to the prior art.

In order to determine the warpage, the width (in FIG. 1 in the z direction) of the warpage rods 1 was determined at 11 measurement positions. As an example, FIG. 3 shows the width of a warpage rod for pure PA 2200 powder as building material in dependence of the measurement positions along the length of the warpage rod (in FIG. 1 in the x direction). Here, the left-most and the right-most measurements points in the figure correspond to the warpage at the ends of the warpage rod 1. For each warpage rod there was a parabola-shaped gradient, which shows that the part width decreases at the ends of the warpage rod. This decrease of the part width results from the fact that during the building process the ends of the warpage rods slightly bend upwards, which resulted in the situation that at the rod ends less building material was applied when applying a layer. Accordingly, less building material was solidified there, so that a smaller width of the warpage rods resulted at these positions.

In order to determine the average of the results, for each one of the four warpage rods, a parabola was fitted to the data and then the average of these four individual fits was calculated. Table 1 shows as a result of such an averaging the mean prefactor of the quadratic term. As the curvature of the parabola depends on the fact, how the width changes along the warpage rods, the stated value in Table 1 is a good measure for the extent of the warpage.

With respect to the dips it is very difficult to use a standardized measuring method. Roughness measurements are able to reflect dips in the surface (orange peel) only very inadequately. For this reason the degree of the dips was subjectively assessed using the three statements: "No dips", "slight dips" and "considerable dips".

Figure 2:
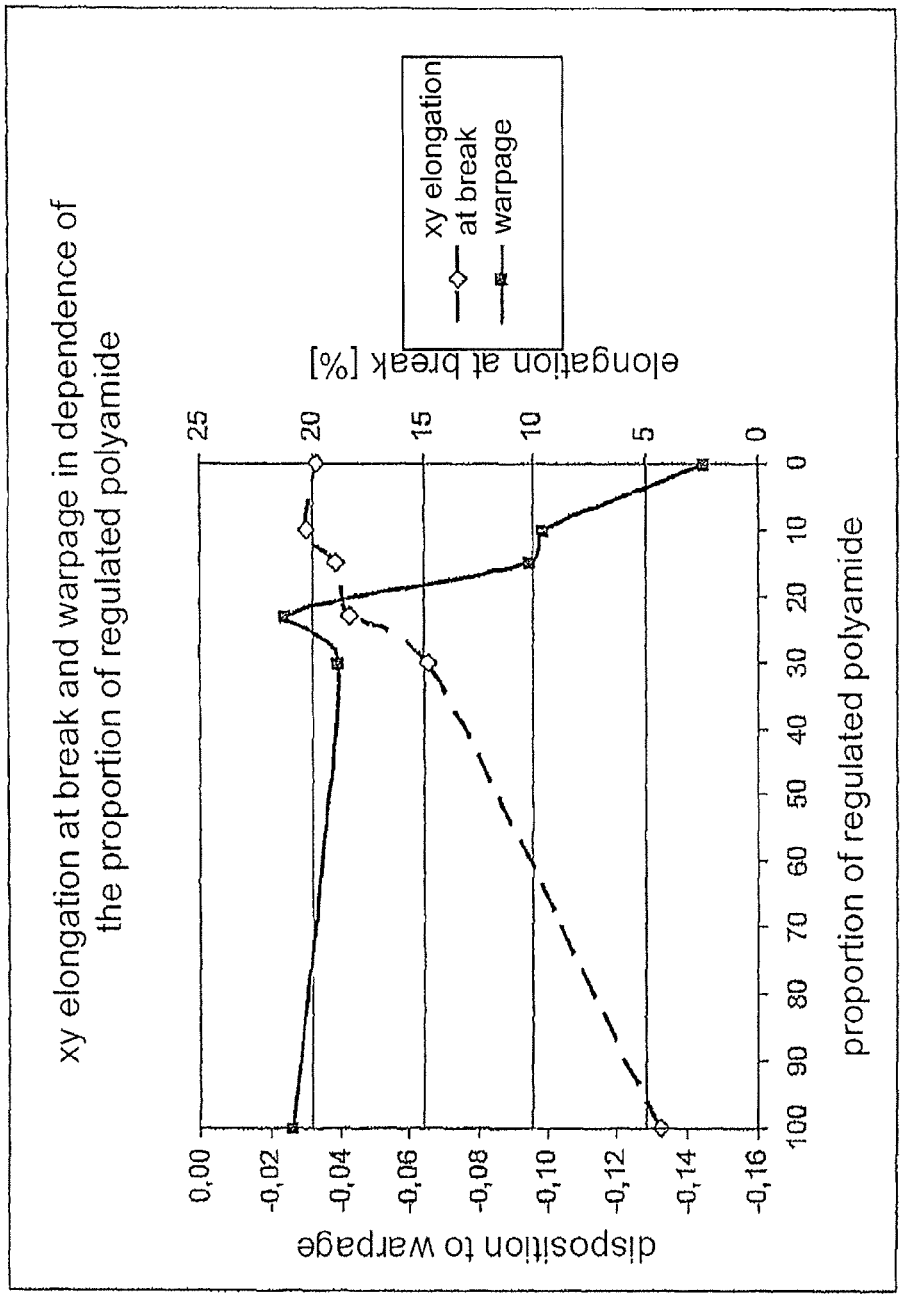
FIG. 2 shows values for the warpage and the elongation at break that were determined at the test structures.

For a better illustration of the obtained results, the determined warpage values and elongation at break values are plotted against the proportion of Vestosint 2157 powder in the powder mixture in FIG. 2. Here, it is desirable to have small values for the occurring warpage and values that are as high as possible for the elongation at break.

As can be seen from the two measurement values on the left in FIG. 2, the elongation at break is very small for a 100% proportion of Vestosint 2157. At the two right-most measuring points in FIG. 2, the warpage is very high, in particular when using 100% PA 2200 powder. Furthermore, it can be seen that the behavior of powder mixtures depends non-linearly on the proportion of Vestosint 2157: The range, within which the warpage as well as the elongation at break have satisfying values corresponds to a Vestosint proportion between 10 and 30%. Within this range, the optimum percentage of Vestosint material depends on whether the main focus is on a high elongation at break, a small warpage behavior or a low refresh rate (low proportion of fresh powder that has to be added when re-using the powder).

In particular, for obtaining a high elongation at break the Vestosint proportion should lie between 10% and 23%. However, as Table 1 shows, for such a case slightly inferior surfaces (increased dips) already occur below a percentage of 15%. Furthermore, it is conspicuous that in particular for a proportion of 23% there is an especially low warpage, whereas the elongation at break rapidly decreases for higher percentages. If dips are to be avoided to the greatest possible extent, the choice of a proportion for the Vestosint powder between 12% and 23% is appropriate. If in addition the warpage shall be low, the choice of a proportion between 15% and 23% is suitable.

As is already emphasized in DE 103 30 590 A1, the obtained part properties strongly depend on the aging properties of the PA 12 powder that is used. Here, the post-condensation that occurs during an aging, plays a central role, wherein the post-condensation can be detected from a change of the viscosity number with a proceeding aging process.

According to DE 103 30 590 A1 PA 12 powders, in which the viscosity number does not rise due to an aging, may consist of so-called regulated polyamides. These are polyamides, for which a stabilization of the end groups has been carried out, e.g. in which the number of carboxy end groups was made to differ from the number of amino end groups. Whereas in DE 103 30 590 A1 only powders were experimentally characterized that had an excess of carboxy end groups and a content of amino end groups below 40 mmol/kg, it is in the same way possible to provide for an amino end group excess in order to prevent a post-condensation and an increase of the solution viscosity in an aging process that accompanies the post-condensation. For example, a diamine could be used as regulator leading to a reduction of the number of free acid groups.

In the end it only matters, whether a part of the powder mixture does show a growth of molar mass in an aging process or does not. Therefore, the invention is not limited to mixtures of regulated and unregulated PA 12 powders, but generally comprises mixtures of a PA 12 powder having a growth of molar mass in an aging process with a PA 12 powder without a growth of molar mass in an aging process.

As a result, the advantages according to the invention can also be obtained, when PA 12 powders other than Vestosint 2157 are used, provided that for these other powders there also is no growth of molar mass with a proceeding aging process. As it only matters, whether a part of the powder mixture shows a growth of molar mass in an aging process or not, the invention is not limited to mixtures of regulated and unregulated PA 12 powders, but also generally includes mixtures of a PA 12 powder having a growth of molar mass in an aging process with a PA 12 powder having no growth of molar mass in an aging process. Here, for the polyamide 12 powder without a growth of molar mass, which has been stabilized with respect to an aging process, the re-crystallization temperature should preferably lie between 140° C. and 150° C. and even more preferably between 143° C. and 148° C. For an assessment of the aging behavior the above-described oven treatment for 20 hours and the determination of the rise of the viscosity number in accordance with ISO 307 may be applied. Here, PA 12 powders, in which the viscosity number rises by less than 10%, are considered to be PA 12 powders without a growth of molar mass. Furthermore, powders, in which the viscosity number rises by more than 15%, are considered to be PA 12-powders with a growth of molar mass.

The powder mixtures according to the invention can be used not only in laser sintering processes. Rather, they can be generally used in processes, in which objects are manufactured layer-wise, wherein a powder solidification is obtained by applying energy in the form of electromagnetic radiation or particle radiation. For example, also a use in a mask sintering method is possible, wherein a powder layer is exposed through a mask.

The limitation for PA 12 powder mixtures, which according to the invention are particularly useful for the manufacturing of three-dimensional objects by a layer-wise solidification of those positions in each layer that correspond to the object by means of the action of electromagnetic radiation or particle radiation, is given by the general processability of such a powder mixture in such a process:

It was shown that for a general suitability as building material in the mentioned processes the viscosity number, determined based on ISO 307, should lie between 80 ml/g and 240 ml/g and preferably between 100 ml/g and 140 ml/g. The melting temperature determined based on ISO 11357, as described above, should lie between 181° C. and 189° C., preferably between 183° C. and 188° C., and the enthalpy of fusion, determined in the same way, should lie between 112 kJ/kg±17 kJ/kg. Furthermore, for the polyamide 12 powder without growth of molar mass the re-crystallization temperature should lie between 140° C. and 150° C. and for the polyamide 12 powder with growth of molar mass the re-crystallization temperature should lie between 130° C. and 145° C. if the re-crystallization temperature is determined based on ISO 11357 as described above.

For the use in a layer-wise manufacturing method, in particular a laser sintering method, the grain size distributions should be selected such that in the mixture the $D_{0.5}$ value lies between 10 μm and 150 μm, preferably between 20 μm and 80 μm, more preferably between 40 μm and 65 μm and even more preferably between 50 μm and 65 μm. In a particularly preferred grain size distribution the $D_{0.9}$ value is smaller than 95 μm, the $D_{0.1}$ value is larger than 30 μm and the $D_{0.5}$ value lies between 40 μm and 65 μm. A possible method for obtaining the above-mentioned grain size distribution can be the method specified in ISO 13320-1 (wet dispersion; laser diffraction eg. by a CILAS instrument (distributed by the company Quantachrome, Germany)), e.g. with water being used as liquid, W5 as dispersant, ultrasound applied by 60 s (+M.) and obscuration 10%.

Of course, the advantages of the powder mixtures according to the invention are also present, when further additives such as fillers and colorants, etc. are added to the powder mixtures. Here, with respect to fillers, one first and foremost would think of glass particles, aluminum grit and carbon fibers.

Finally, it should be emphasized again that by the powder mixtures according to the invention parts having a low warpage can be manufactured, even if the proportion of old powder exceeds 60%. Thereby, a remarkable reduction of the proportion of fresh powder down to 30% or 20% or 10% is possible compared to the prior art. Ideally, the proportion of fresh powder can nearly completely be avoided, meaning that it may lie at only 0.1%.

In a preferred embodiment, a powder mixture is adapted to manufacture of a three-dimensional object by a layer-wise solidification of a building material in powder form at positions in each layer that correspond to the object by means of the action of electromagnetic radiation or particle radiation. The powder mixture includes of a mixture of a first polyamide 12 powder and a second polyamide 12 powder. The first polyamide 12 powder is characterized by an increase of its viscosity number determined in accordance with ISO 307 by less than 10%, when the powder is exposed for 20 hours to a temperature that lies 10° C. below its melting temperature under nitrogen atmosphere. The second polyamide 12 powder is characterized by an increase of its viscosity number determined in accordance with ISO 307 of 15% or more, when the powder is exposed for 20 hours to a temperature that lies 10° C. below its melting temperature under nitrogen atmosphere. The proportion of the first polyamide 12 powder in the mixture with the second polyamide 12 powder may lie between 10 and 30 percent by weight.

The written description and figures are for explanatory purposes. The boundaries of the present invention are set forth in the claims.

The invention claimed is:

1. A powder mixture that is suitable for manufacturing a three-dimensional object by a layer-wise solidification of a building material in powder form at positions in each layer that correspond to the object by means of the action of electromagnetic radiation or particle radiation, the powder mixture comprising a mixture of a first polyamide 12 powder and a second polyamide 12 powder,
   wherein the first polyamide 12 powder having an increase of its viscosity number determined in accordance with ISO 307 by less than 10%, when the powder is exposed for 20 hours to a temperature that lies 10° C. below its melting temperature under nitrogen atmosphere,
   wherein the second polyamide 12 powder having an increase of its viscosity number determined in accordance with ISO 307 of 15% or more, when the powder is exposed for 20 hours to a temperature that lies 10° C. below its melting temperature under nitrogen atmosphere, and
   wherein the proportion of the first polyamide 12 powder in the mixture with the second polyamide 12 powder lies between about 10 and about 23 weight-%.

2. The powder mixture according to claim 1,
   wherein the first polyamide 12 powder and the second polyamide 12 powder have the following properties before they are subjected to a temperature stress:
   a viscosity number, determined in accordance with ISO 307, that lies between 80 ml/g and 240 ml/g,
   a melting temperature that lies between 181° C. and 189° C. and an enthalpy of fusion of 112 kJ/kg±17 kJ/kg,
   wherein the re-crystallization temperature of the first polyamide 12 powder lies between 140° C. and 150° C. and
   the re-crystallization temperature of the second polyamide 12 powder lies between 130° C. and 145° C.

3. The powder mixture according to claim 2, wherein the viscosity number, determined in accordance with ISO 307, lies between 100 ml/g and 140 ml/g.

4. The powder mixture according to claim 1, wherein the first polyamide 12 powder is an end group-stabilized polyamide 12 powder and the second polyamide 12 powder is a polyamide 12 powder that has not been end group-stabilized.

5. The powder mixture according to claim 1, wherein the proportion of the first polyamide 12 powder in the mixture lies between about 15 and about 23 weight-%.

6. The powder mixture according to claim 1, wherein the powder mixture has a D0.5 value between 10 µm and 150 µm.

7. The powder mixture according to claim 1, wherein the powder mixture has a D0.5 value between 20 µm and 80 µm.

8. The powder mixture according to claim 1, wherein the powder mixture has a D0.9 value that is smaller than 95 µm, D0.1 value that is larger than 30 µm and a D0.5 value between 40 µm and 65 µm.

9. The powder mixture according to claim 8, wherein the powder mixture has a D0.5 value between 50 µm and 65 µm.

10. The powder mixture according to claim 1, further comprising at least one additional additive and/or at least one additional filler.

11. The powder mixture according to claim 10, which comprises glass particles, aluminum grit or carbon fibers as filler.

12. A method for manufacturing a three-dimensional object layer-wise, in which a building material in powder form is solidified at positions in each layer that correspond to the object by means of the action of electromagnetic radiation or particle radiation,
   wherein a powder mixture according to claim 1 is used as the building material.

13. The method according to claim 12, wherein a proportion of the building material between 0.1% and 40% is a powder mixture that never before has been used in such a manufacturing method and the other part of the building material is a powder mixture that has already been used in a corresponding manufacturing method.

14. The method of claim 12, comprising using the powder mixture for a layer-wise manufacturing of a three-dimensional object by sintering by means of a selectively applied electromagnetic radiation or particle radiation.

15. A three-dimensional object, which has been manufactured layer-wise by sintering by selectively applying electromagnetic radiation or particle radiation,
   wherein the object has been manufactured from a powder mixture according to claim 1.

* * * * *